UNITED STATES PATENT OFFICE.

ISAAC RECKHOW, OF BROOKLYN, NEW YORK, ASSIGNOR TO JNO. GRIFFITH, OF SAME PLACE.

IMPROVEMENT IN CURING PRUNES.

Specification forming part of Letters Patent No. 28,411, dated May 22, 1860.

*To all whom it may concern:*

Be it known that I, ISAAC RECKHOW, of Brooklyn, in the county of Kings and State of New York, have invented a new and Improved Method of Curing Prunes; and I do hereby declare that the following is a full, clear, and exact description of the same.

It is well known to every fruit-dealer that prunes, like raisins and other similar fruit, when they have been exposed to the influence of a moist atmosphere for some time, become covered with a white grayish film resembling mold. In this state the prunes are not salable, and a large quantity of this valuable fruit is spoiled or sold at half-price, because fruit-dealers have heretofore had no means to remove said film, and to restore the prunes to their original appearance and freshness.

To effect this is the object of my invention, which consists in exposing the prunes to a current of steam for a few minutes in a suitable box or receptacle, whereby said film is perfectly removed, and the prunes, when dry, assume their original and fresh appearance.

To enable those skilled in the art to make and use my invention, I will proceed to describe it.

When the prunes come from the vessel, and after they have been inclosed in the damp atmosphere of the ship's hold, they are generally more liable to turn gray or white than they would be if they had to be transported a short distance only and over dry land. The fact therefore that most prunes eaten in this country are imported from Europe increases the value of my invention.

I take the prunes and spread them in a box or other receptacle on wire screens or open shelves, and I expose them now to a current of steam, said box or receptacle being closed with the exception of two pipes, one to admit the steam and the other to carry it off. The screens or shelves have to be arranged in such a manner that the surface of each prune is reached as completely as possible by the current of steam. After about five minutes the prunes are taken from the box, and they are now dried in the open air and packed up again, as before. By this operation their appearance becomes perfectly fresh and healthy, and they can be sold without difficulty or loss. Their taste and aroma are entirely preserved, and I have found that prunes cured by my method will keep just as long as they do when newly dried and kept in a dry place.

This invention is of considerable value to fruit-dealers, as it does not involve an expensive process, and it saves much trouble and loss.

Having thus fully described my invention, what I claim as new, and desire to secure by Letters Patent, is—

The within-described method of curing prunes by exposing them to a current of steam, substantially in the manner specified.

ISAAC RECKHOW.

Witnesses:
   B. GIROUX,
   WM. THOMPSON.